US008418259B2

(12) United States Patent
Horal et al.

(10) Patent No.: US 8,418,259 B2
(45) Date of Patent: Apr. 9, 2013

(54) TPM-BASED LICENSE ACTIVATION AND VALIDATION

(75) Inventors: Mikael Horal, Renton, WA (US); Hakki Tunc Bostanci, Redmond, WA (US); Vandana Gunupudi, Redmond, WA (US); Ning Zhang, Bothell, WA (US); Scott Daniel Anderson, Kirkland, WA (US); Stefan Thom, Snohomish, WA (US); Erik Holt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 498 days.

(21) Appl. No.: 12/652,094

(22) Filed: Jan. 5, 2010

(65) Prior Publication Data

US 2011/0167503 A1 Jul. 7, 2011

(51) Int. Cl.
*G06F 7/04* (2006.01)
(52) U.S. Cl.
USPC ............................................ 726/33; 713/187
(58) Field of Classification Search .................. 713/156, 713/164–167, 175, 193; 705/59, 57, 56, 705/50; 726/26, 30, 32, 33
See application file for complete search history.

(56) References Cited

U.S. PATENT DOCUMENTS

| 7,269,725 | B2 | 9/2007 | Cromer et al. | |
| 7,467,370 | B2 * | 12/2008 | Proudler et al. | 717/100 |
| 8,213,618 | B2 * | 7/2012 | Dewan | 380/277 |
| 2005/0144440 | A1 * | 6/2005 | Catherman et al. | 713/156 |
| 2005/0289343 | A1 | 12/2005 | Tahan | |
| 2006/0064752 | A1 | 3/2006 | Wang et al. | |
| 2006/0090070 | A1 * | 4/2006 | Bade et al. | 713/164 |
| 2006/0112423 | A1 * | 5/2006 | Villadiego et al. | 726/9 |
| 2007/0101156 | A1 | 5/2007 | Novoa et al. | |
| 2007/0113077 | A1 * | 5/2007 | Brickell | 713/164 |
| 2008/0046581 | A1 * | 2/2008 | Molina et al. | 709/229 |
| 2008/0126802 | A1 | 5/2008 | Li et al. | |
| 2008/0184028 | A1 * | 7/2008 | Anson et al. | 713/156 |
| 2008/0319779 | A1 | 12/2008 | Hughes et al. | |

OTHER PUBLICATIONS

"TPM" based security on Notebook PCs—white paper Sundeep Bajikar Jun. 2002.*

(Continued)

*Primary Examiner* — Nirav B. Patel

(57) ABSTRACT

A Trusted Activation License (TAL) can be comprised of a key unique to a Trusted Platform Module (TPM) and identifying information of the software applications bundled with the computing device having that TPM. To activate the software applications, the identifying information in the TAL can be compared against that of the software applications being activated, and the unique TPM key in the TAL can be compared against that of the TPM on the computing device on which the activation is taking place. Subsequent validations can be based on a protected association between the TAL and an Attestation Identity Key (AIK) that can be generated by the TPM as part of the activation step. Optionally, Platform Configuration Registers (PCRs) of the TPM can be periodically changed during validation to protect against useage of one TPM for validations on multiple computing devices.

17 Claims, 12 Drawing Sheets

OTHER PUBLICATIONS

Gronim, William, "Emerging Technologies of Ownership", Retrieved at << http://www.idtrail.org/index2.php?option=com_content&do_pdf=1&id=495>>, Jun. 20, 2006, pp. 2.

Arbaugh, Bill, "Improving the TCPA Specification", Retrieved at << http://ieeexplore.ieee.org/stamp/stamp.jsp?tp=&arnumber=1023792&isnumber=22017>>, IEEE Computer Society Press, vol. 35, No. 8, Aug. 2002, pp. 77-79.

Reid, et al., "Privacy and Trusted Computing", Retrieved at << http://citeseerx.ist.psu.edu/viewdoc/download?doi=10.1.1.1.8958&rep=rep1&type=pdf>>, Proceedings of 14th International Workshop on Database and Expert Systems Applications, Sep. 1-5, 2003, pp. 1-17.

* cited by examiner

TPM-BASED LICENSE ACTIVATION AND VALIDATION

BACKGROUND

Unlike many other products, the computer-executable instructions that comprise a software application can be perfectly reproduced, resulting in a copy that is, for all intents and purposes, identical to the original. As a result, the authors and manufacturers of software applications have struggled against improperly licensed copies of their software applications, with each unlicensed copy potentially resulting in one less sale of that software application. Lack of control over the distribution of properly licensed, authentic software application products also means that malicious computer-executable instructions, traditionally known as "malware", including, for example, viruses and Trojans, can appear in the copies of software, affecting user privacy and security and negatively impacting the image of the original software manufacturer. Additionally, as networks of computing devices, including worldwide networks, become more ubiquitous, the copying of software applications continues to increase.

Much like with other products, software manufacturers have attempted to combat the unauthorized copying of software applications through mechanisms that make the original, properly purchased software application, better than the copy. For example, software manufacturers have offered post-sales service, such as continued upgrades and improvements, to those whose copies of software applications are properly licensed. With malware becoming increasingly dangerous, the post-sales upgrades and improvements offered to those with legitimate copies of software applications have become more important, as such upgrades and improvements are often directed to increasing the security of the software applications, and decreasing their vulnerability to malware.

For software applications independently purchased and installed on a computing device by a user, the user can be required to enter a product identifier, such as a product key, SKU, or other like identifier, to prove the legitimacy of the software application and to activate, or otherwise validate, the software application. However, for software applications that are installed on a computing device by the original manufacturer of such a computing device, and are sold bundled with it, a less user-involved, and more automatic, mechanism can be utilized. In particular, information identifying the bundled software applications, which can be used to prove the legitimacy of such applications, and can be used to activate, or otherwise validate, them, can be installed on the computing device by the original manufacturer at the time the computing device is manufactured. Subsequently, computer-executable instructions directed to activation and validation of bundled software applications can be executed, and can find the identifying information stored on the computing device and use it to activate and validate the bundled software applications.

Unfortunately, the identifying information currently installed on computing devices is not very well protected. For example, the identifying information is often stored in unprotected form in a known storage area such that false identifying information can be inserted into the activation and validation process, thereby allowing unlicensed, illegitimate copies of software applications to be activated and validated. Additionally, the identifying information currently installed on computing devices does not identify the software applications that are installed on any one particular computing device, further enabling mechanisms that can cause unlicensed, illegitimate copies of software applications to be activated and validated.

Because, at least in part, of the limitations of the current automated activation and validation mechanism utilized for bundled software applications, paper-based certificates of authenticity are still utilized to provide proof of the legitimacy of the copies of the software applications bundled with the computing device. Such paper certificates of authenticity, however, can represent a significant cash value, as they can be utilized to activate any copy of the relevant software applications. As such, the paper certificates of authenticity create a risk of theft and fraud that the computing device manufacturer must protect against.

SUMMARY

The Trusted Platform Module that is installed on modern computing devices can be utilized to uniquely identify a particular computing device in order to provide for computing device specific activation and validation of software applications that are bundled on the computing device. The TPM comprises a unique set of keys that can be associated with unique identifiers of the bundled software applications to provide for the computing device specific activation and validation. In such a manner, a non-proprietary hardware device, such as the TPM, can be utilized to provide hardware-based security for activation and validation.

In one embodiment, a unique key of the TPM can be combined with unique identifiers of the bundled software applications and the resulting combination can be encrypted using a key associated with a manufacturer of the bundled software applications to create a Trusted Activation License (TAL). The TAL can then be stored in an appropriate location on the computing device, such as on a storage medium that is not likely to be modified by subsequent user upgrades to the computing device. When first executed, the bundled software applications can be activated by verifying the encrypted combination, verifying the unique key of the TPM contained in the TAL against the TPM that is installed on the computing device on which the bundled software applications are being activated, and verifying that the unique identifiers contained within the TAL are of the bundled software applications that are on that particular computing device.

In another embodiment, the verification of the unique key of the TPM can comprise the creation of an Attestation Identity Key (AIK) that can act as the identity of the bundled software applications on the particular computing device. Upon a subsequent execution of the bundled software applications, they can be validated by verifying the AIK and its association with the unique identifiers of the bundled software applications.

In yet another embodiment, manufacturers of computing devices can pre-generate the encrypted combination of the unique key of the TPM and the unique identifiers of the bundled software applications and can, at manufacture time, merely copy the correct encrypted combination onto a computing device being manufactured based on the TPM that is installed on the computing device.

In a further embodiment, to prevent the utilization of a single computing device as an activation and validation source for multiple computing devices, one or more Platform Configuration Registers (PCRs) of the TPM can be periodically modified during the execution of a validated and activated software application. An improper modification, signaling the use of such a single computing device as an activation and validation source for multiple computing devices, can be detected and prevented.

This Summary is provided to introduce a selection of concepts in a simplified form that are further described below in the Detailed Description. This Summary is not intended to identify access control features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
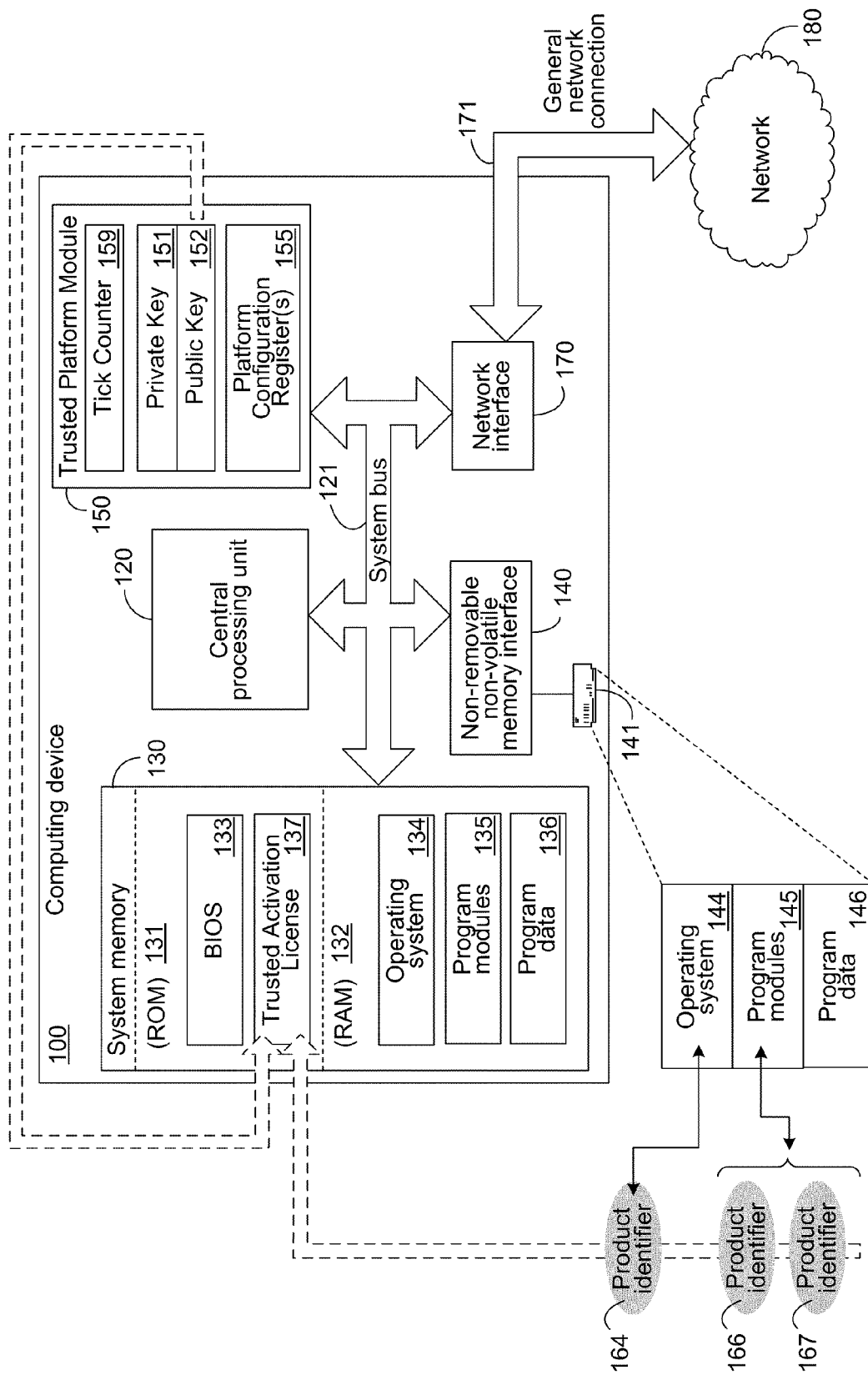
FIG. 1 is a diagram of an exemplary computing device comprising a TPM.

The following description relates to the utilization of a Trusted Platform Module (TPM) to provide computing device specific activation and validation of software applications that are bundled with a particular computing device. The public version of the Endorsement Key (EKpub) of the TPM can be combined with unique identifiers, such as the Stock Keeping Units (SKUs) or product keys, of one or more of the bundled software applications, and the resulting combination can be encrypted using the private key of a manufacturer of the bundled software applications to create a Trusted Activation License (TAL). The TAL can be created in advance and stored in a database such that an appropriate TAL for a TPM being installed in the computing device can be copied onto the computing device as part of the manufacturing process. Alternatively the TAL can be created at the time of the manufacture of the computing device and copied thereon. When the bundled software applications are executed for the first time, they can be activated by reference to the TAL. The EKpub of the TAL can be compared to the EKpub of the TPM installed on the computing device, and the unique software application identifiers of the TAL can be compared to those of the applications actually installed on the computing device. If activation is successful, an association between the TAL and an Attestation Identity Key (AIK) that can be generated as part of the activation process can be stored on the computing device. Subsequent validations can be performed with reference to the stored association, and can further, to prevent utilization of one computing device as an activation and validation resource for multiple computing devices, modify one or more Platform Configuration Registers of the TPM. A periodic check of the PCR of the TPM can indicate if the computing device was utilized to activate or validate software applications of multiple computing devices, and can cause the software applications on the computing device to become invalidated.

The techniques described herein focus on, but are not limited to, the specific anti-tampering mechanisms described. Indeed, the teachings below are equally applicable to any mechanisms by which the unique identity of a non-proprietary hardware device, such as the TPM, can be associated with identities of one or more software applications to restrict the legitimate usage of particular copies of software applications to the computing device with the TPM. Consequently, the descriptions below are not meant to limit the enumerated embodiments to the specific examples referenced.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

With reference to FIG. 1, an exemplary computing device 100 is illustrated, comprising, in part, hardware elements referenced further in the methods described below. The exemplary computing device 100 can include, but is not limited to, one or more central processing units (CPUs) 120, a system memory 130, a Trusted Platform Module (TPM) 150, and a system bus 121 that couples various system components, including the system memory, to the processing unit 120. The system bus 121 may be any of several types of bus structures including a memory bus or memory controller, a peripheral bus, and a local bus using any of a variety of bus architectures. Depending on the specific physical implementation, one or more of the CPUs 120, the system memory 130 and the TPM 150 can be physically co-located, such as on a single chip. In such a case, some or all of the system bus 121 can be nothing more than silicon pathways within a single chip structure and its illustration in FIG. 1 can be nothing more than notational convenience for the purpose of illustration.

The TPM 150 can comprise TPM-specific keys 151 and 152 for the encryption and decryption of information provided to it. Traditionally, the TPM 150 comprises an initial set of immutable public and private encryption keys that can be utilized, in a known and established manner, to obtain disposable public and private encryption keys. Such keys are traditionally known as Endorsement Keys (EKs), and the TPM 150 illustrated in FIG. 1 comprises an EK private key 151 and an EK public key 152. Additionally, the TPM 150 can comprise Platform Configuration Registers (PCRs) 155 that can securely store values or other data uniquely associated with the state of the computing device 100. Such values are traditionally provided to the TPM 150 by the CPU 120 via the system bus 121. In some embodiments, only specific code executed by the CPU 120 would be permitted to send data to the TPM 150 that would modify the values stored in the PCRs 155. The TPM 150 can further comprise a tick counter 159 that can provide rudimentary timekeeping functionality in a secure manner. The values of the tick counter 159 can comprise a random value known as a "boot nonce" that can be changed every time the TPM 150 is restarted, and can, thereby, serve as an indicator of whether the TPM has been restarted since the boot nonce was last read.

In addition to the elements described above, the computing device 100 also typically includes computer readable media, which can include any available media that can be accessed by the computing device 100. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the computing device 100 may operate in a networked environment via logical connections to one or more remote computers. The logical connection depicted in FIG. 1 is a general network connection 171 to a network 180 that can be a local area network (LAN), a wide area network (WAN) or other networks. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Among computer storage media, the system memory 130 comprises computer storage media in the form of volatile and/or nonvolatile memory, including Read Only Memory (ROM) 131 and Random Access Memory (RAM) 132. A Basic Input/Output System 133 (BIOS), containing, among other things, code for booting the computing device 100, is typically stored in ROM 131. RAM 132 typically contains data and/or program modules that are immediately accessible to and/or presently being operated on by the processing unit 120. By way of example, and not limitation, FIG. 1 illustrates operating system 134, other program modules 135, and program data 136 as being resident in the RAM 132.

The computing device 100 may additionally include other removable/non-removable, volatile/nonvolatile computer storage media. By way of example only, FIG. 1 illustrates a hard disk drive 141 that reads from or writes to non-removable, non-volatile magnetic or solid-state media. Other removable/non-removable, volatile/nonvolatile computer storage media that can be used with the exemplary computing device include, but are not limited to, solid-state based storage devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145 and program data 146. Note that these components can either be the same as or different from operating system 134, other program modules 135 and program data 136. Operating system 144, other program modules 145 and program data 146 are given different numbers hereto illustrate that, at a minimum, they are different copies. The operating system 144 and the application programs whose modules comprise the program modules 145 can each be associated with a product identifier, such as the product identifiers 164, 166 and 167, respectively. Such product identifiers 164, 166 and 167 can be the Stock Keeping Units (SKUs) of the relevant software application products, or can be product keys that can be unique to that particular copy of the operating system 144 and program modules 145 installed on the particular computing device 100.

A Trusted Activation License (TAL) 137 can, as will be described in detail below, be comprised of the product identifiers 164, 166 and 167 and can further be comprised of the EKpub 152 of the TPM 150 as shown in FIG. 1. The TAL 137 can be stored on the computing device 100 in such a way that common user upgrades to the computing device will not inadvertently remove the TAL. Thus, for example, the TAL 137 can be stored as part of the ROM 131 as shown in FIG. 1, including as a separate entity, as illustrated, or as part of the BIOS 133.

Figure 2:
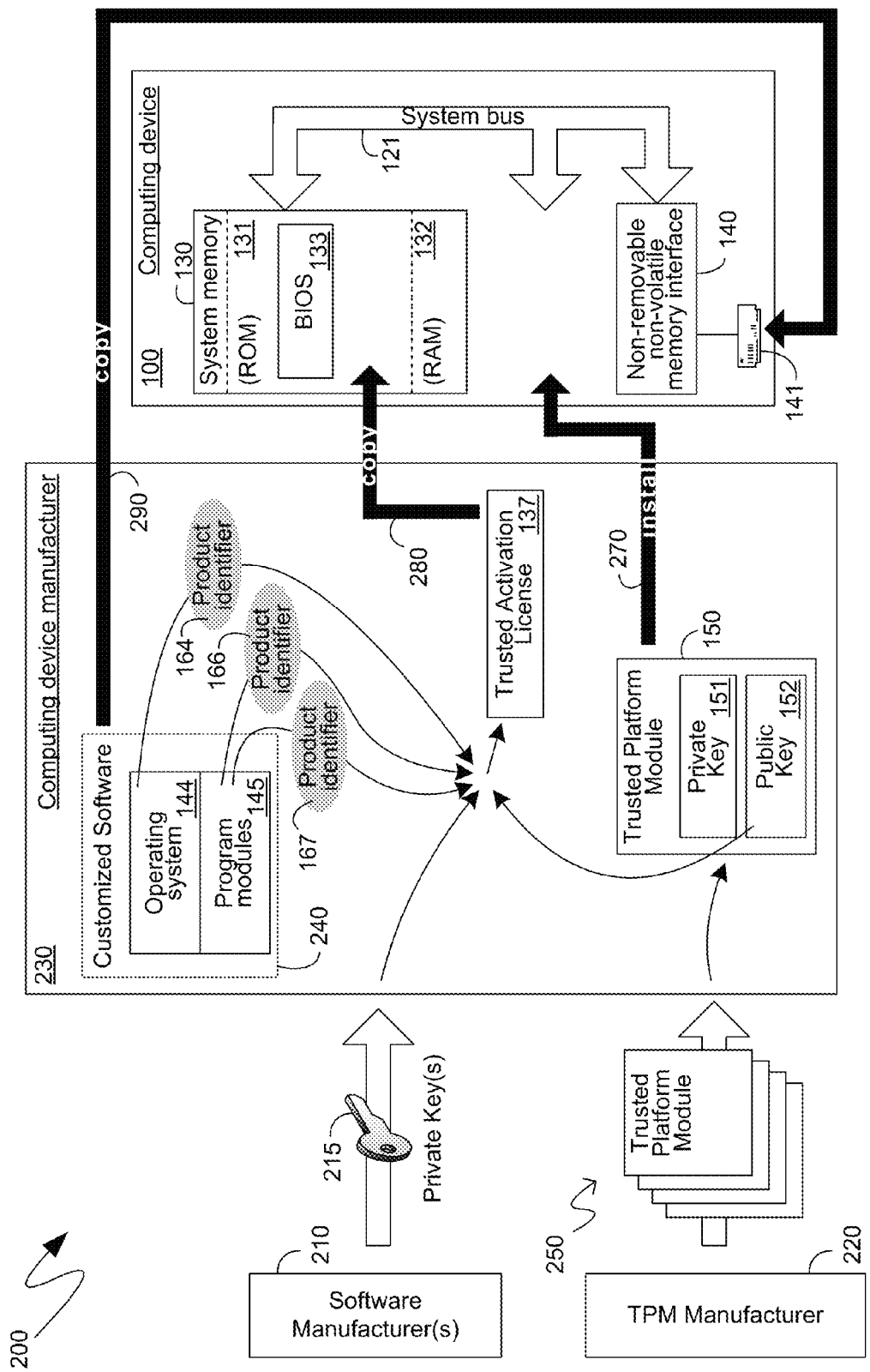
FIG. 2 is a block diagram of an exemplary just-in-time generation and provisioning of a Trusted Activation License.

Turning to FIG. 2, the system 200 shown therein illustrates one exemplary embodiment by which the TAL 137 can be generated and installed on the computing device 100. As can be seen, the system 200 can comprise a computing device manufacturer 230 that can manufacture the computing device 100 of FIG. 1. The system 200 of FIG. 2 can also comprise a TPM manufacturer 220, and one or more software manufacturers 210 of any one or more of the operating system 144 in the application programs whose modules comprise the program modules 145. While the descriptions below, and the illustrations in FIG. 2, and otherwise, indicate and illustrate a single TPM manufacturer 220 and a single computing device manufacturer 230 with clearly defined roles, those of skill in the art will recognize that often multiple entities are responsible for taking TPMs from silicon into a finished, operating computing device. For example, one entity can manufacture TPMs, a second entity can manufacture a chipset that includes those TPMs and a third entity can manufacture a computing device from the chipset. The illustrations provided by the figures, and the descriptions provided below, are meant to encompass such intermediate parties, as the extension of the below-described mechanisms to such multiple intermediate parties would be trivial. For example, the actions attributed to the computing device manufacturer 230 can be equally performed by two or more independent entities without impacting any aspect or security of the overall process. Thus, references below to the computing device manufacturer 230 are meant to include any one or more entities, whether independent or otherwise, that perform the same actions in aggregate.

As shown in FIG. 2, the software manufacturers 210 can provide their private keys 215 to the computing device manufacturer 230 to enable the computing device manufacturer to create the TAL 137 in the manner to be described in detail below. As will be known by those skilled in the art, the provision of the private keys 215 can represent a security risk to the software manufacturers 210. Thus, in one embodiment, the keys utilized to encrypt the collection that ultimately becomes the TAL 137 need not be the private keys 215 directly but rather can be keys that are chained to the private keys 215, such as through a delegation operation by the software manufacturers 210, or other chain of certificates, or through other like security mechanisms known to those skilled in the art. Thus, it is for simplicity of description and illustration only that the below descriptions will refer to the private keys 215 of the software manufacturers 210 directly.

The computing device manufacturer 230 can also receive trusted platform modules 250, one of which can be the TPM 150 described above, from the TPM manufacturer 220. Since the trusted platform modules 250 can traditionally be embodied in independent silicon-based products, the provision of the trusted platform modules 250 by the TPM manufacturer 220 can be in accordance with whatever raw material purchasing arrangements the computing device manufacturer 230 utilizes for other hardware elements of the computing device 100.

In the embodiment illustrated by the system 200 of FIG. 2, the computing device manufacturer 230 can generate the TAL 137 at the time that the computing device manufacturer is manufacturing the computing device 100 upon which such a TAL will be stored. Thus, the TAL 137 can comprise product identifiers 164, 166 and 167 of a customized set of software applications 240 that can be unique to the computing device 100, such as may have been particularly selected by the purchaser of the specific computing device 100. In one embodiment, the TAL 137 can be generated by the computing device manufacturer 230 by combining the product identifiers 164, 166 and 167, of the customized software 240 that is to be installed on the computing device 100, with the EKpub 152 of the TPM 150 that is to be installed on the computing device 100, and then encrypting the resulting combination with the private keys 215 of the software manufacturers 210. In another embodiment, to protect the security of the EKpub 152 of the TPM 150, rather than combining the EKpub with the product identifiers directly, the computing device manufacturer 230 can instead combine a hash of the EKpub 152 with the product identifiers. Such a hash of the EKpub 152 can be obtained using one-way hashing algorithms such that the hash can be subsequently obtained by those with access to the EKpub, but that the EKpub itself cannot be obtained from, nor derived from, the hash.

In a further embodiment, multiple TALs, such as the TAL 137, can be generated by the computing device manufacturer 230 for inclusion in the computing device 100. For example, a single TAL, such as the TAL 137, can be generated for each of the product identifiers 164, 166 and 167. Alternatively, a single TAL, such as the TAL 137, can be generated for each collection of the product identifiers 164, 166 and 167 that represents a collection of software applications each manufactured by a single software manufacturer from among the software manufacturers 210. In such cases, only a single private key, from among the private keys 215, need to be utilized to sign a particular TAL.

Once the computing device manufacturer 230 has generated the TAL 137, it can copy the TAL to the computing device 100, such as by storing it in the BIOS 133, or otherwise in the ROM 131, as illustrated by the action 280. The computing device manufacturer 230 can further install the TPM 150, whose EKpub 152 was utilized to generate the TAL 137, onto the computing device 100, as illustrated by the action 270. Additionally, the computing device manufacturer 230 can copy the customized software 240, whose product identifiers 164, 166 and 167 were utilized to generate the TAL 137, onto a storage medium of the computing device 100, such as the hard disk drive 141, as illustrated by the action 290. The relevant aspects of the manufacture of the computing device 100 can thus be completed.

Figure 3:
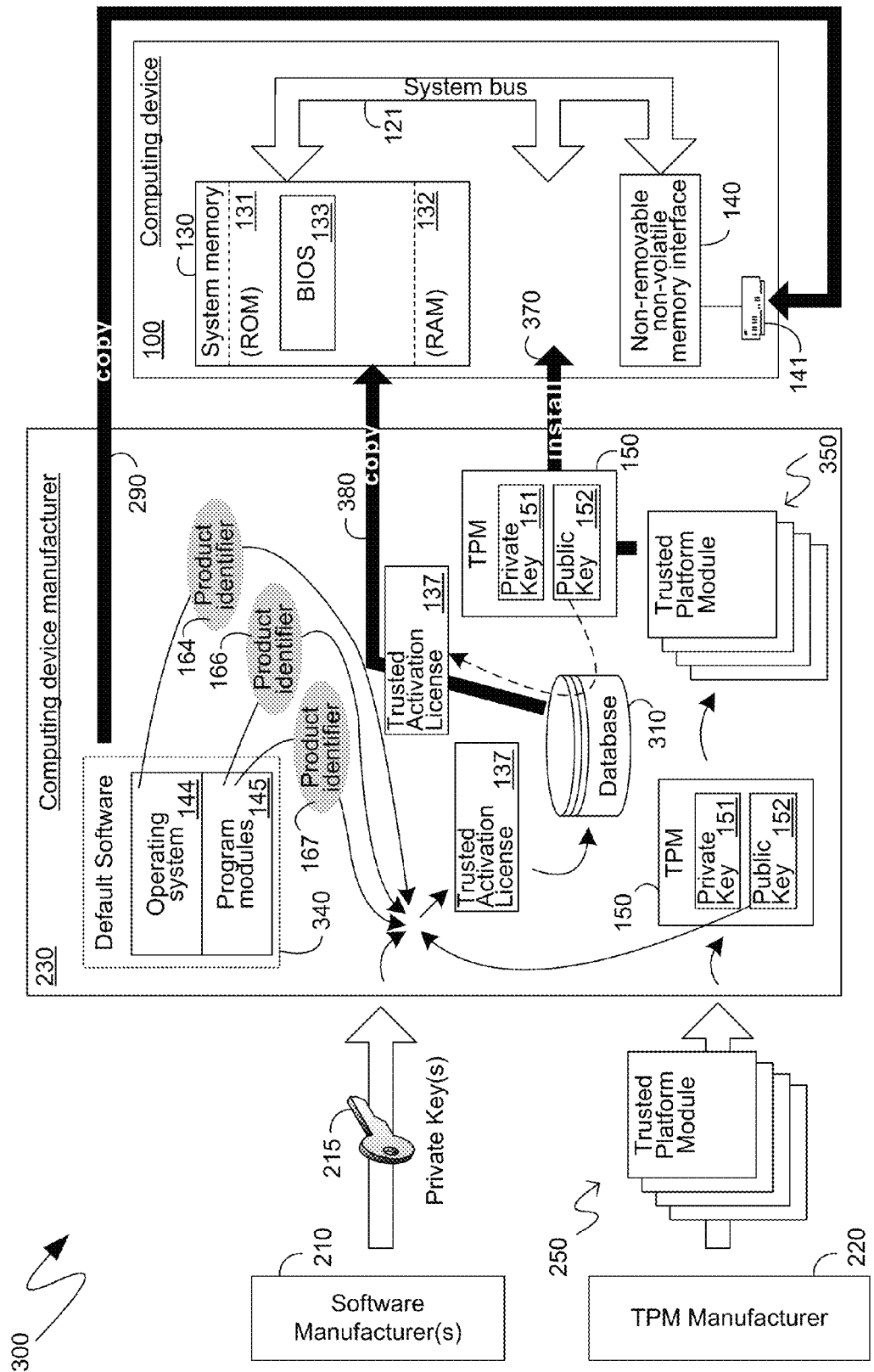
FIG. 3 is a block diagram of an exemplary bulk generation and subsequent provisioning of a Trusted Activation License.

In another embodiment, computing device manufacturers, such as the computing device manufacturer 230, that install a default set of software onto a computing device, such as the computing device 100, and do not allow for customization of the bundled software set, can pre-generate one or more TALs, such as the TAL 137. Turning to FIG. 3, the system 300 shown therein illustrates an exemplary set of actions for such pre-generation. As in the case of the system 200 of FIG. 2, the system 300 of FIG. 3 likewise comprises the software manufacturers 210, the TPM manufacturer 220, the computing device manufacturer 230 and the computing device 100 being manufactured by the computing device manufacturer. However, as shown in the system 300, the computing device manufacturer 230 can install a default set of software 340 onto the computing device 100 that is known in advance and is not customizable on a per-computing-device basis. As such, the computing device manufacturer 230 can pre-generate TALs, such as the TAL 137, and store them in a database 310, from which they can be subsequently retrieved to be copied to a computing device, such as the computing device 100.

The TAL 137 can be generated by encrypting, with the private keys 215, a combination of the product identifiers 164, 166 and 167 of the default software 340 with the EKpub 152 of the TPM 150. As before, variants, including the utilization of a hash of the EKpub 152, individual product identifiers, or product identifiers grouped by manufacturer, as well as keys that chain to the private keys 215, are likewise contemplated. When pre-generating the TAL 137, the computing device manufacturer 230 can obtain the EKpub 152 of each TPM 150 from among the TPMs 250 received from the TPM manufacturer 220. Subsequently, when storing the generated TAL 137 in the database 310, the computing device manufacturer 230 can associate the stored TAL with the EKpub 152 utilized to generate it. The TPM 150 can then be stored with other TPMs 350 to await installation on a computing device, such as the computing device 100. While FIG. 3 illustrates the computing device manufacturer 230 reading the EKpub 152 from a TPM 150 in order to generate the TAL 137, it is more likely that, with the TPMs 250, the computing device manufacturer 230 will also receive a listing of the EKpubs of the TPMs 250, and will be able to simply utilize such a listing in the pre-generation of the TALs.

Subsequently, as shown in the system 300 of FIG. 3, when the computing device manufacturer 230 is manufacturing a computing device, such as the computing device 100, a TPM 150 can be selected from among the TPMs 350 available to the computing device manufacturer and can be installed on the computing device 100 as shown by the action 370. The EKpub 152 of such a TPM 150 can be read by the computing device manufacturer 230 and can be utilized to find, within the database 310, the TAL, such as the TAL 137, associated with such a EKpub 152. The found TAL 137 can then be copied to the computing device 100, such as into the ROM 131, as illustrated by the action 380. In addition, the default software 340 can be copied to a storage medium of the computing device 100, such as the hard disk drive 141, as shown by the previously described action 290.

In yet another embodiment, a computing device manufacturer, such as the computing device manufacturer 230, can receive blank TPMs, from a TPM manufacturer, such as the TPM manufacturer 220, that do not comprise any EKs. In such a case, the computing device manufacturer can inject EKs into such TPMs prior to installation onto a computing device, such as the computing device 100. If the computing device manufacturer 230 is generating a TAL, such as the TAL 137, at the time that the computing device 100 is being manufactured, such as illustrated in the system 200 of FIG. 2, then, rather than reading the EKpub 152 from the TPM 150, or from a listing provided by the TPM manufacturer 220, the computing device manufacturer can, instead, generate their own EK pair, utilize the EKpub as described above, and then inject the EK pair into the TPM 150 prior to installation on the computing device 100. However, if the computing device manufacturer 230 is pre-generating TALs, such as illustrated in the system 300 of FIG. 3, then a slightly different mechanism from that shown in FIG. 3 can be utilized if the computing device manufacturer is provided with blank TALs.

Figure 4:
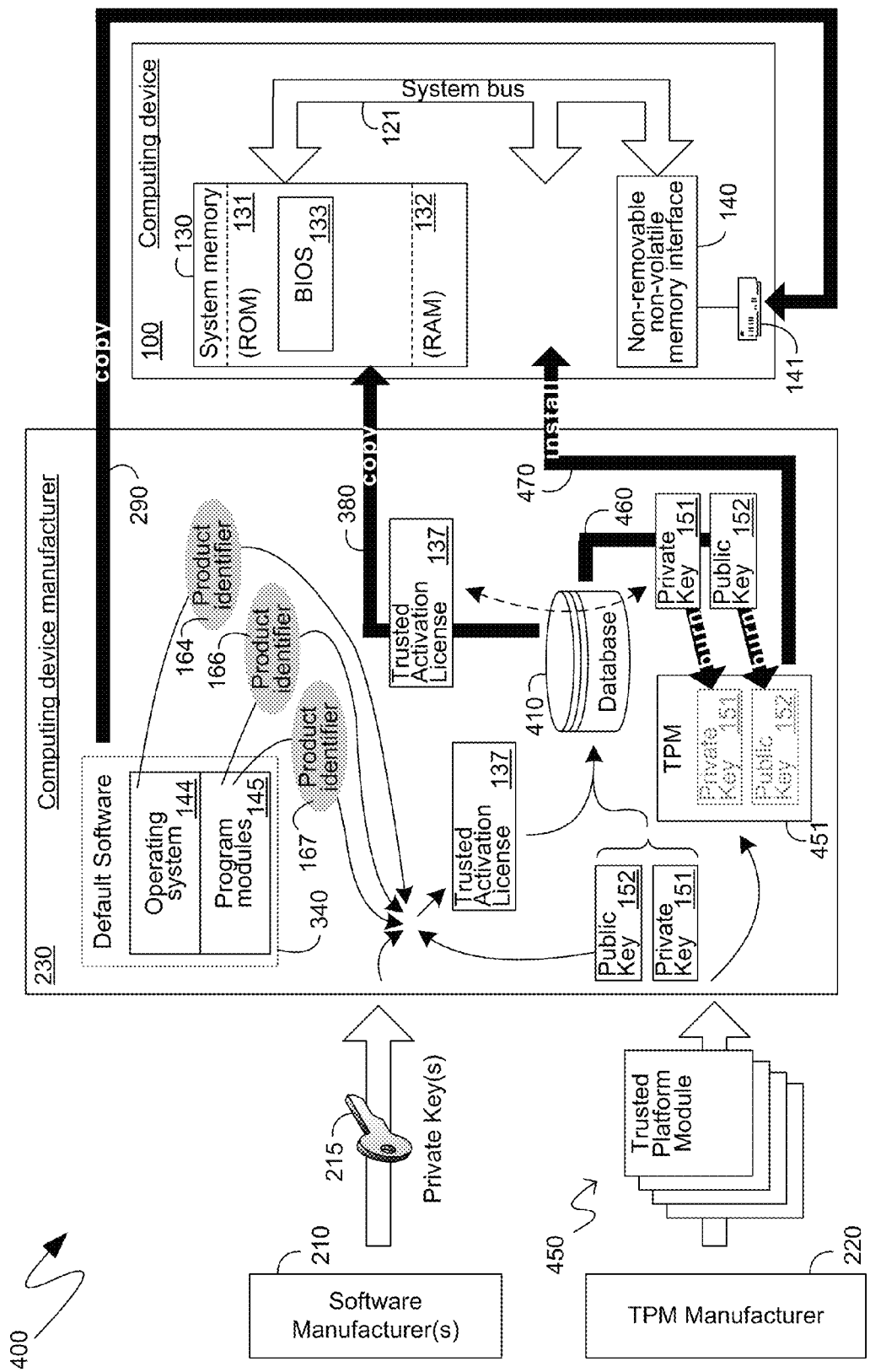
FIG. 4 is a block diagram of an exemplary bulk generation and subsequent provisioning of a Trusted Activation License with blank Trusted Platform Modules.

In particular, and turning to FIG. 4, the system 400 shown therein illustrates an exemplary set of mechanisms that can be performed by the computing device manufacturer 230 if provided with blank TPMs 450. The computing device manufacturer 230 can internally generate an EK pair, such as the EK pair comprising the EKpriv 151 and the EKpub 152, and can utilize the EKpub 152 of the generated EK pair to generate a TAL 137 in the manner described in detail above. Subsequently, when storing the TAL 137 into the database 410, the computing device manufacturer 230 can likewise store, associated with the TAL 137, the generated EK pair comprising the EKpriv 151 and the EKpub 152.

Then, when manufacturing the computing device 100, the computing device manufacturer 230 need not search the database 410 for a TAL associated with a particular EKpub of the TPM being installed onto the computing device 100. Instead, a computing device manufacturer 230 can select a blank TPM 451 from among the blank TPMs 450 provided by the TPM manufacturer 220, and can inject such a blank TPM 451 with an EKpriv and EKpub, such as the EKpriv 151 and the EKpub 152, as shown by the action 460. In one embodiment, the EK pair with which the blank TPM 451 was injected can simply be the next EK pair queued up in the database 410. Once the EK pair has been injected into the blank TPM 451, the TPM can be installed in the computing device 100, as illustrated by the action 470, and the associated TAL 137 can be copied to the ROM 131, as illustrated by the previously described action 380. As also described previously, the default software 340 can be copied to a storage medium of the computing device 100, such as the hard disk drive 141, as shown by the action 290.

Figure 5:
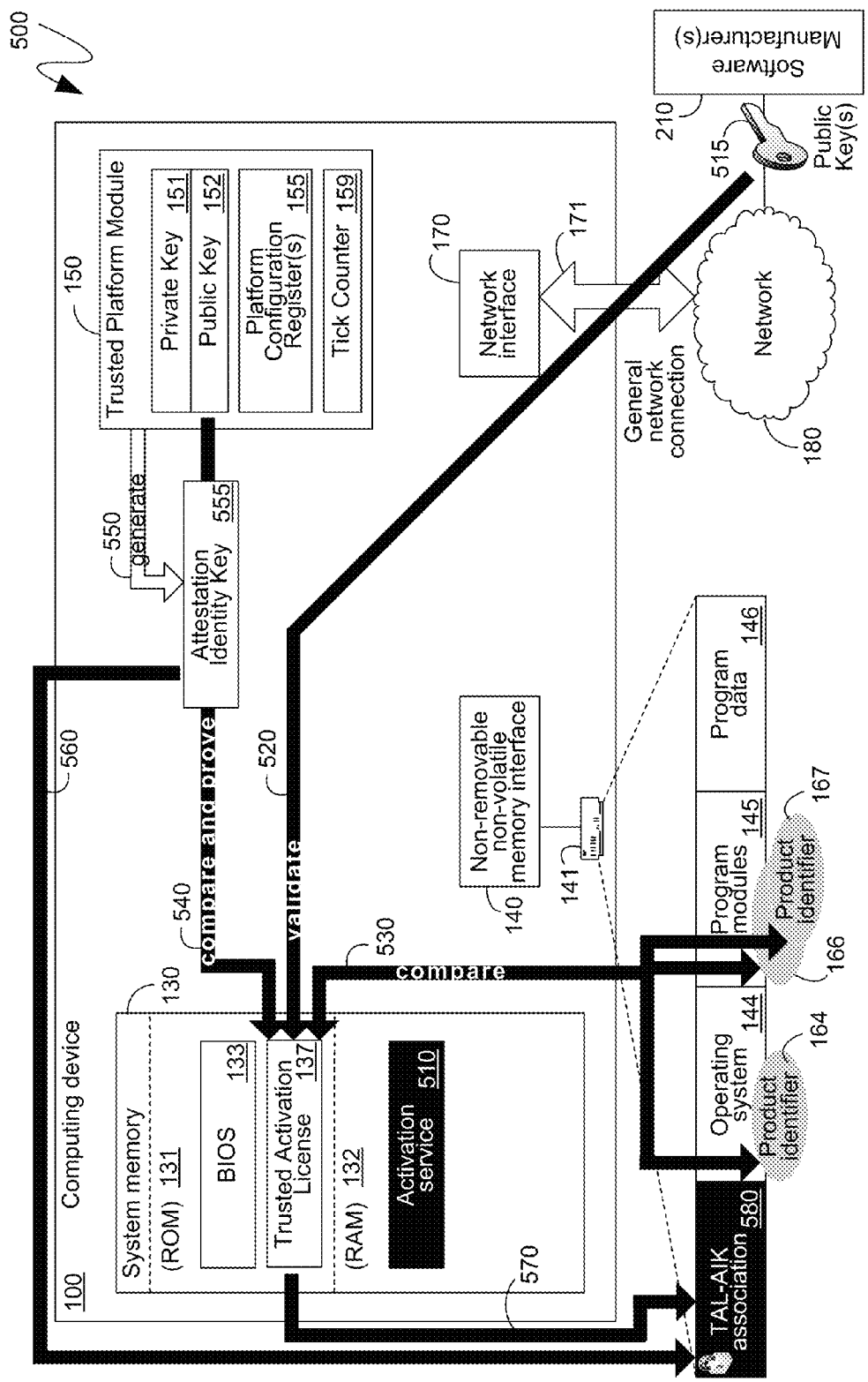
FIG. 5 is a block diagram of an exemplary activation of software applications using a Trusted Activation License.

Once a computing device, such as the computing device 100, has been manufactured with a particular set of bundled software, such as the operating system 144 and program modules 145, a particular TPM, such as the TPM 150, and a particular TAL, such as the TAL 137, execution of the bundled software can initiate mechanisms that can utilize the TPM and the TAL to activate, and subsequently validate, the bundled software. Turning to FIG. 5, the system 500 shown therein illustrates an exemplary activation of the operating system 144 and program modules 145 bundled with the computing device 100. The actions performed by the activation service 510 of the system 500 in activating the operating system 144 and program modules 145 are shown in black in FIG. 5. In one embodiment, the activation service 510 can be separate and apart from the operating system 144 and program modules 145, while in another embodiment, the activation service can be part of the operating system 144 and program modules 145, such as a built-in activation service.

As shown in the system 500 of FIG. 5, the activation service 510 can obtain public keys 515 from the software manufacturers 210 such as via the network 180. As will be known to those skilled in the art, public keys, such as the public keys 515, can be freely provided, though if a different private key was utilized in generating the TAL 137, such as described in detail above, then the activation service 510 can obtain an appropriate, corresponding, public key, whether from the software manufacturers 210 or otherwise. With the correct public key such as the public keys 515, the activation service 510 can validate the TAL 137, as shown by the action 520. For example, the TAL 137 can comprise the product identifiers 164, 166 and 167 and the EKpub 152 in an unencrypted form, and can further comprise data representing those same elements as encrypted by a private key. In such a case, validation of the TAL 137 with the public key 515 can comprise decrypting the encrypted data with the public key to verify that the decrypted data matches the data that is stored in the unencrypted form. Other validations using known cryptographic mechanisms are likewise contemplated by the validation action 520. As will be known by those skilled in the art, the validation action 520 can indicate if the TAL 137 was tampered with.

If the TAL 137 was not tampered with, the activation service 510 can compare the product identifiers contained within the TAL to the product identifiers 164, 166 and 167 of the operating system 144 and application programs whose modules comprise the program modules 145 and program data 146 that are bundled on the computing device 100, as illustrated by the action 530. Such a comparison action 530 can verify that the bundled software applications, such as the operating system 144, and the application programs that comprise the program modules 145 and program data 146, are, in fact, properly licensed copies. However, to verify that the bundled software applications are properly licensed for the particular computing device 100, the activation service 510 can compare the EKpub of the TAL 137 to the EKpub 152 of the TPM 150 installed on the computing device 100, as shown by the action 540.

As will be known by those skilled in the art, the TPM 150 can be simply queried by the activation service 510 for its EKpub 152. However, to guard against illegitimate TPM-like processes, or processes simulating a TPM for purposes of activating and validating otherwise invalid copies of software applications, the activation service 510 can request that the TPM 150 prove that it, in fact, possesses an EK pair of which the EKpub 152 was the one provided by the TPM 150. To prove possession of the EK pair, the activation service 510 can request that the TPM 150 generate an Attestation Identity Key (AIK) 555, as shown by the generation action 550. As will be known by those skilled in the art, one or more of the above actions requested of the TPM 150 may be limited to only being performed if the requestor has access to a particular authorization code, often referred to as the ownerAuth, of the TPM 150. For purposes of the present descriptions, it can be assumed that the activation service 510 can have access to such an ownerAuth. For example, the activation service 510 can be associated with the operating system 144 which can, in turn, comprise booting mechanisms that can, upon booting the operating system on the computing device 100, detect an unowned TPM 150 and can proceed to generate an ownerAuth for such a TPM, such that the activation service 510 can be provided with this ownerAuth.

Once the TPM 150 has generated the AIK 555, as requested by the activation service 510, the activation service can generate what is commonly known as an "activation blob" to activate the AIK 555 on the TPM 150 and, in the process, obtain proof from the TPM that it, in fact, possesses the EK pair of which the EKpub 152 was provided by the TPM 150 when it was queried by the activation service 510. In particular, the activation service 510 can generate an activation blob by combining a secret with the public version of the AIK 555, and then encrypting that combination with the EKpub 152. The TPM 150 can then utilize the EKpriv 151 to decrypt the encrypted information provided by the activation service and obtain the combination of the secret and the public version of the AIK 555. Since the TPM is aware of the public version of the AIK 555, it can differentiate between that and the secret and can, thereby, identify the secret. Provision of the secret, by the TPM 150, back to the activation service 510 can, thereby, act as a proof that the TPM 150 does, in fact, possess the EK pair of which the EKpub 152 was provided by the TPM 150 when queried by the activation service 510.

If the validation of the TAL 137 with the public keys 515 was successful, and if the TAL 137 comprised the product identifiers 164, 166 and 167, and if the activation service 510 was able to verify that the EKpub 152 of the TAL is the same as that of the TPM 150 on the computing device 100, the activation service can then activate the bundled software applications, such as the operating system 144, and the application programs whose modules comprise the program modules 145. In response to such an activation, the activation service 510 can store, as shown by the action 570, an association 580 between the TAL 137 and the AIK 555 in a protected manner. For example, in one embodiment, the activation service 510 can store the association 580 onto a portion of the hard disk drive 141 that only the activation service can access, or whose access can otherwise be limited to a discrete set of processes.

In one embodiment, the association 580 can comprise hashes of the TAL 137 and the AIK 555. Optionally, for ease of subsequent access, the activation service 510 can further store the TAL 137 and the AIK 555 on the hard disk drive 141, such as in a token store area often provided by operating systems, such as the operating system 144. While it is the association 580 of the TAL 137 and the AIK 555 that can indicate the completion of the activation of the bundled software applications, for purposes of the below descriptions the TAL-AIK association 580 can be considered to, optionally, comprise the TAL 137 and the AIK555 individually, such as could be stored in a token store area.

Figure 6:
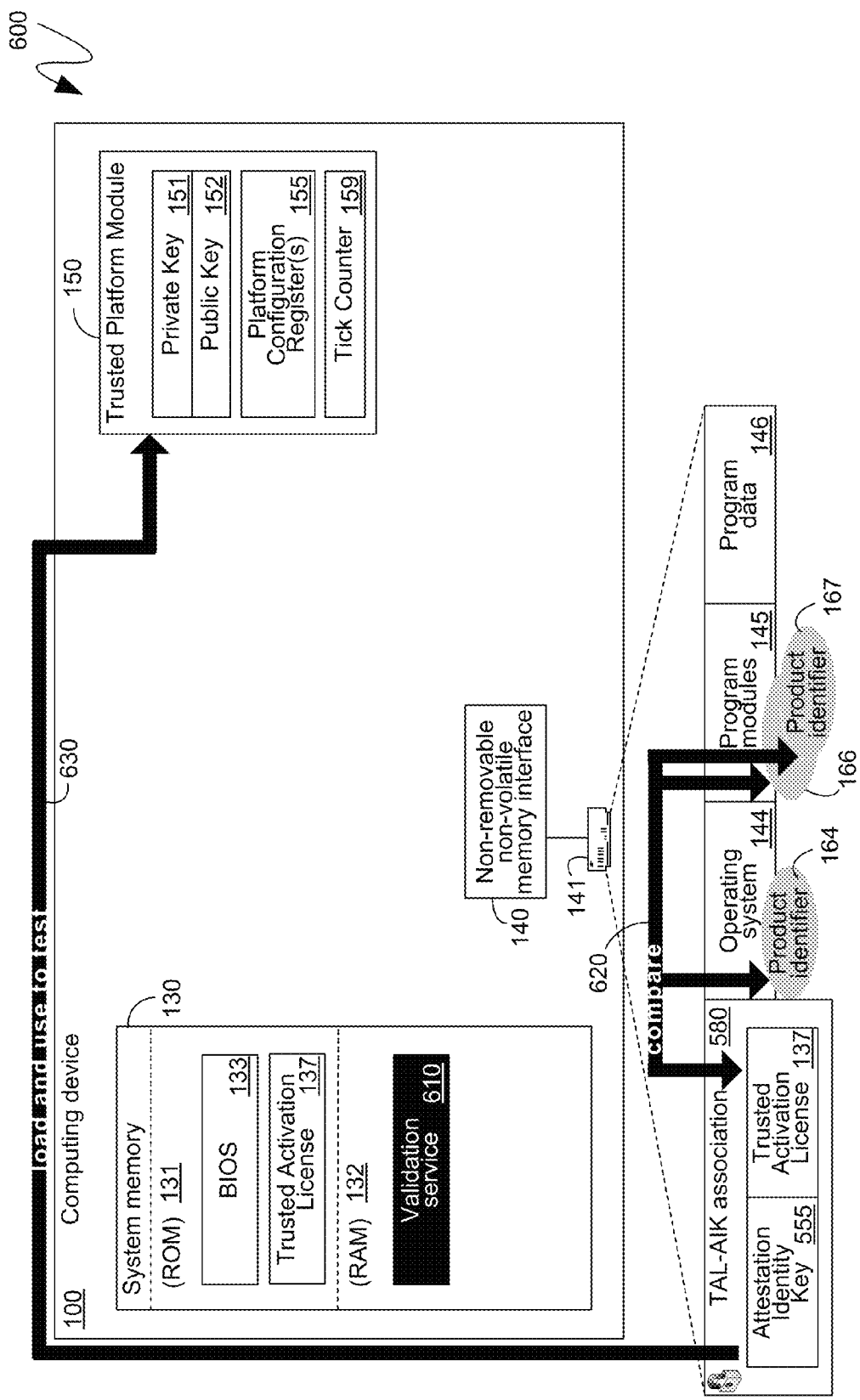
FIG. 6 is a block diagram of an exemplary validation of software applications using a Trusted Activation License.

After the bundled software applications have been activated by the activation service 510, such as in the manner described above, any subsequent execution of such bundled software applications can merely comprise validating their prior activation. Turning to FIG. 6, the system 600 shown therein illustrates an exemplary operation of the validation service 610 that can perform such validation. As in the case of the activation service 510, the validation service 610 can be a separate stand-alone set of computer executable instructions, or it can be a component of one or more of the operating system 144 or the application programs whose modules comprise the program modules 145. Also, as above, the actions of the validation service 610 are shown in FIG. 6 in black.

Initially, the validation service 610 can access the TAL-AIK association 580 and can obtain the AIK 555, such as from the TAL-AIK association 580, and can load the AIK into the TPM 150, as illustrated by the action 630. If the AIK 555 can be loaded into the TPM 150, then the validation service 610 can determine that the TPM into which it loaded the AIK is still the same TPM as was utilized to create the AIK, such as described in detail above. Because of the difficulty in changing the TPM of a computing device, if the AIK 555 can be loaded into the TPM 150, the validation service 610 can determine that the computing device 100 is still the same computing device on which the bundled software applications were originally activated.

In one embodiment, as a further check, the validation service 610 can request that the TPM 150 utilize the now-loaded AIK 555 to sign a random challenge. More specifically, in a manner well known to those skilled in the art, the validation service 610 can provide the TPM 150 with a random value and request the TPM 150 encrypt the random value with the private version of the AIK 555 that the TPM has loaded. The returned encrypted data should be able to be decrypted by the validation service 610 using the public version of the AIK 555. If, in fact, the validation service 610 can decrypt returned encrypted data, then the validation service can determine that the TPM 150 did, indeed, load the AIK 555, and that the indication of the loaded AIK was not merely from a rogue process simulating a TPM.

The validation service 610 can further compare the product identifiers of the TAL 137 to the product identifiers 164, 166 and 167 of the software applications bundled on the computing device 100, as illustrated by the action 620. If the product identifiers 164, 166 and 167 of the software applications bundled on the computing device 100 match the product identifiers of the TAL 137, and if the AIK 555 was properly loaded by the TPM 150, the validation service 610 can then determine that the copies of the bundled software applications installed on the computing device 100 are still valid.

As may have been recognized by those skilled in the art, the above described mechanisms can be circumvented by a system in which the communications of the activation service 510 and the validation service 610, can be redirected to another computing device, such that the TPM of a single computing device can be utilized to activate and validate multiple copies of the bundled software applications on multiple computing devices when only one copy of the bundled software applications on a single computing device may have been properly licensed. Such a circumvention can be quite impractical. Nevertheless, to guard against it, the validation service 610 can, optionally, change the value of one or more of the Platform Configuration Registers (PCRs) 155 of the TPM 150, such that if another validation service were to utilize the same TPM 150 to perform the validation of a different copy of the bundled software applications, such as, for example, on another computing device, the validation service 610 would detect an unexpected variation in the values of one or more of the PCRs 155 and could, consequently, invalidate the copy of the bundled software applications on the computing device 100.

Figure 7:
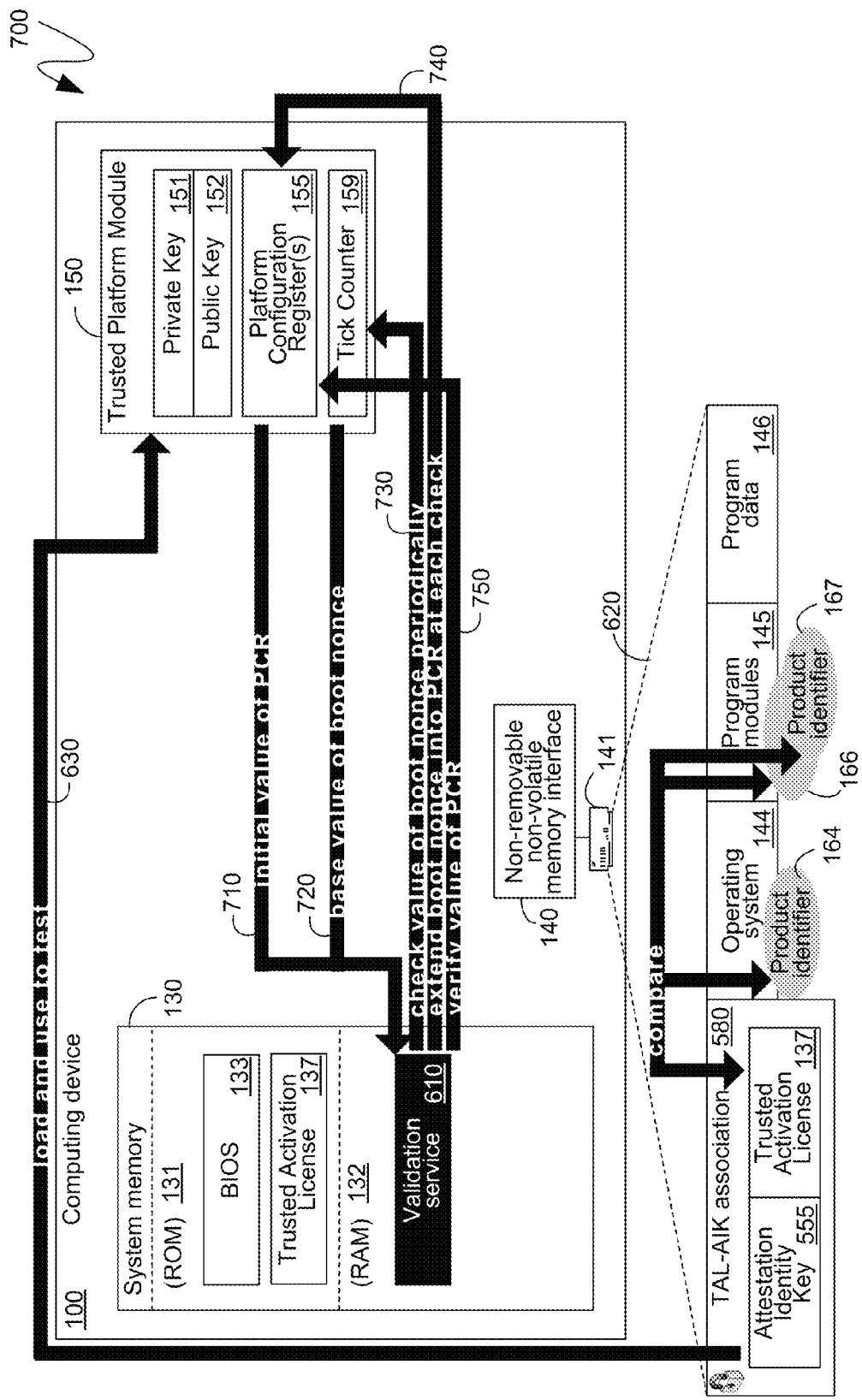
FIG. 7 is a block diagram of an exemplary validation of a Trusted Activation License that modifies Platform Configuration Registers of the Trusted Platform Module.

More particularly, and turning to system 700 of FIG. 7, the actions 620 and 630 of the validation service 610 illustrated in FIG. 6 are shown in conjunction with optional actions 710 through 750 that can perform the above described change to the value of one or more of the PCRs 155. As part of the validation process of this embodiment, an initial value of one or more of the PCRs 155 can be obtained by the validation service 610, such as by the action 710 shown in FIG. 7, when the validation service first validates the bundled software applications. In addition, to guard against a rebooting of the TPM 150 to erase the changes to the PCRs 155, the validation service 610 can further obtain an initial value of the boot nonce from the tick counter 159, as shown by the action 720. As will be known by those skilled in the art, the values of the tick counter 159 can comprise the boot nonce, which can be merely a random value whose value does not change until the TPM 150 is rebooted.

After the validation service 610 initially validates the bundled software applications, such as in the manner described in detail above, it can periodically check the value of the boot nonce, such as illustrated by the action 730. If the boot nonce has changed, the validation service 610 can invalidate the bundled software applications, since the TPM 150 was somehow restarted without the computing device 100 also being restarted, signaling a suspicious condition. When the validation service 610 periodically checks the value of the boot nonce, it can extend the boot nonce into one or more of the PCRs 155, as illustrated by the action 740. To avoid unnecessary complexity, the one or more PCRs selected can be selected from among those PCRs whose value does not change after completion of the booting of the computing device 100. The extension of a value into a PCR changes the value of that PCR in a manner well known to those of skill in the art.

The validation service 610 can maintain, within its memory space, the last value of the PCR being utilized. With each subsequent extension of the boot nonce into the PCR, the validation service 610 can perform such an extension to the PCR value in its memory space. If the value of the PCR in the TPM 150 does not match that in the memory space of the validation service 610, the validation service can determine that another validation service utilized the same TPM 150, and can, consequently, invalidate the bundled software application programs on the computing device 100. In a further embodiment, to guard against malicious interference with the messages from the TPM 150 to the validation service 610, the validation service can request that the TPM 150 sign the values of the tick counter 159 and the one or more PCRs from among the PCRs 155 using the AIK 555 that would have been loaded into the TPM by the validation service.

Figure 8:
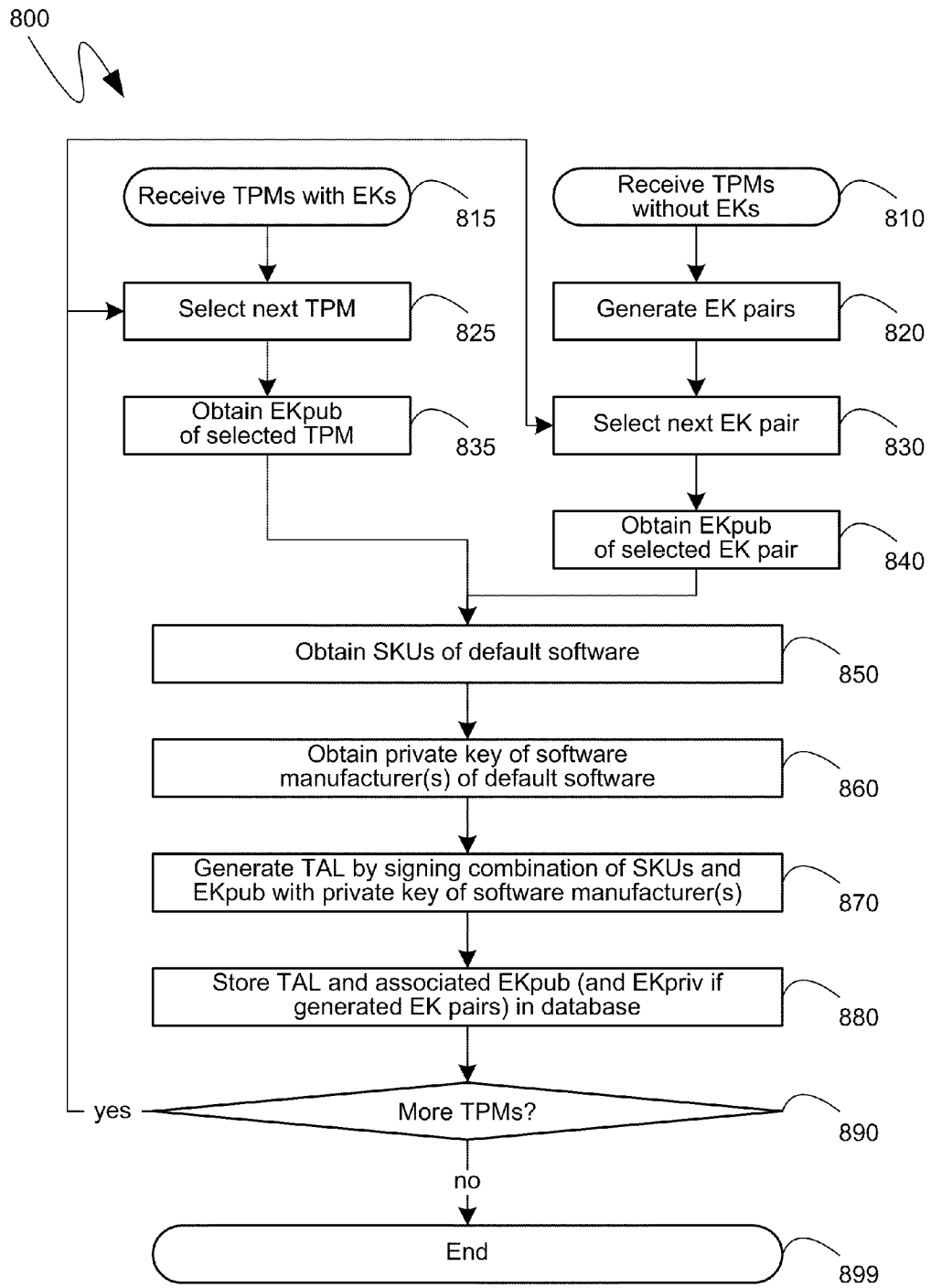
FIG. 8 is a flow diagram of an exemplary bulk generation of Trusted Activation Licenses.

The above described mechanisms are further described with reference to the flow diagrams 800, 900 and 901, 1000 and 1100 of FIGS. 8, 9a and 9b, 10 and 11, respectively. Turning first to FIG. 8, the flow diagram 800 shown therein illustrates an exemplary set of steps that can be performed by a manufacturer of computing devices, such as a computing device manufacturer 230 referenced above. Initially, as can be seen in the flow diagram 800, the computing device manufacturer can either receive TPMs that already comprise EK pairs, such as indicated at step 815, or blank TPMs, such as indicated at step 810.

If the computing device manufacturer received TPMs that already comprise EK pairs at step 815, the computing device manufacturer can then select one of the TPMs at step 825 and can, subsequently, at step 835 obtain the EKpub of the selected TPM. If, on the other hand, the computing device manufacture received blank TPMs at step 810, the computing device manufacturer can generate EK pairs at step 820. Subsequently, at step 830, the next EK pair, from among those generated in step 820, can be selected and the corresponding EKpub of such a selected EK pair can be obtained at step 840.

Whether the EKpub was obtained at either step 835 or step 840, the computing device manufacturer can proceed, at step 850, to obtain the identifying information of the default software that is to be installed on a computing device. At step 860, the computing device manufacturer can obtain the private key of the software manufacturer or manufacturers of the default software. With the EKpub obtained at steps 835 or 840, the identifying information obtained in step 850 and the private key obtained at step 860, the computing device manufacturer can, at step 870, generate a TAL for the bundled software applications. As described above, in one embodiment a single TAL can be generated for all of the bundled software applications, while in other embodiments multiple TALs can be generated including, for example, one TAL for each bundled software application, or, as another example, one TAL for each set of bundled software applications manufactured by the same software manufacturer. As will be recognized by those skilled in the art, the relevant identifying information obtained at step 850, and the relevant private keys obtained at step 860 can vary depending on which kind of TAL is being generated at step 870. Additionally, as also will be recognized by those skilled in the art, the ordering of the steps of the flow diagram 800 of FIG. 8 are exemplary only, and are not meant to indicate a required ordering. For example, either, or both, of steps 850 and 860 can have been performed even prior to the receipt of the TPMs at steps 810 or 815.

Once one or more TALs are generated at step 870, the computing device manufacturer can store the generated TALs into a database, at step 880, and can associate the stored TALs with the EKpubs utilized to generate them. At step 890, the computing device manufacturer can check if there are more TPMs available, and, if there are, processing can return to steps 825 or 830, depending on whether populated or blank TPMs were received at steps 815 and 810, respectively. If the computing device manufacturer determines, at step 890, that it has already generated TALs for every TPM in its possession, the relevant processing can end at step 899.

Figure 9A:
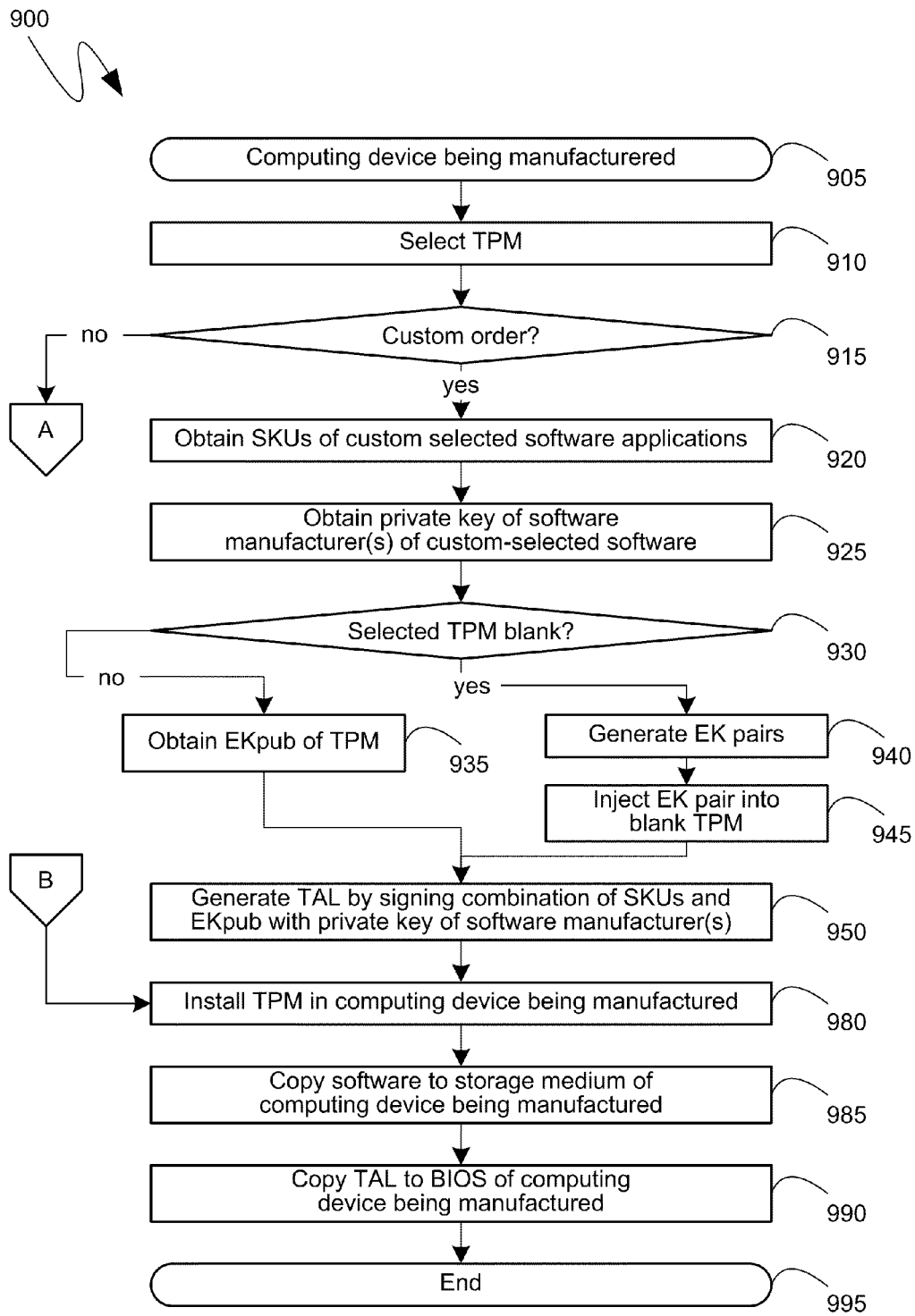
FIGS. 9a and 9b are flow diagrams of an exemplary generation and subsequent provisioning of a Trusted Activation License.

Turning to FIG. 9a, the flow diagram 900 shown therein illustrates an exemplary series of steps that can be performed, such as by a computing device manufacturer, to provision a computing device with a TAL. Initially, at step 905, a particular computing device can enter the manufacturing process. During the manufacturing process, at step 910, the computing device manufacturer can select a TPM, such as from an available stock of TPMs, for installation on the computing device being manufactured. At step 915, a determination can be made as to whether the computing device being manufactured is a custom order in that, for example, the software applications bundled with such a computing device have been individually selected by the purchaser of such a computing device. If, at step 915, a determination is made that the computing device being manufactured is not a custom order, processing can proceed with the steps of the flow diagram 901 shown in FIG. 9b.

Figure 9B:
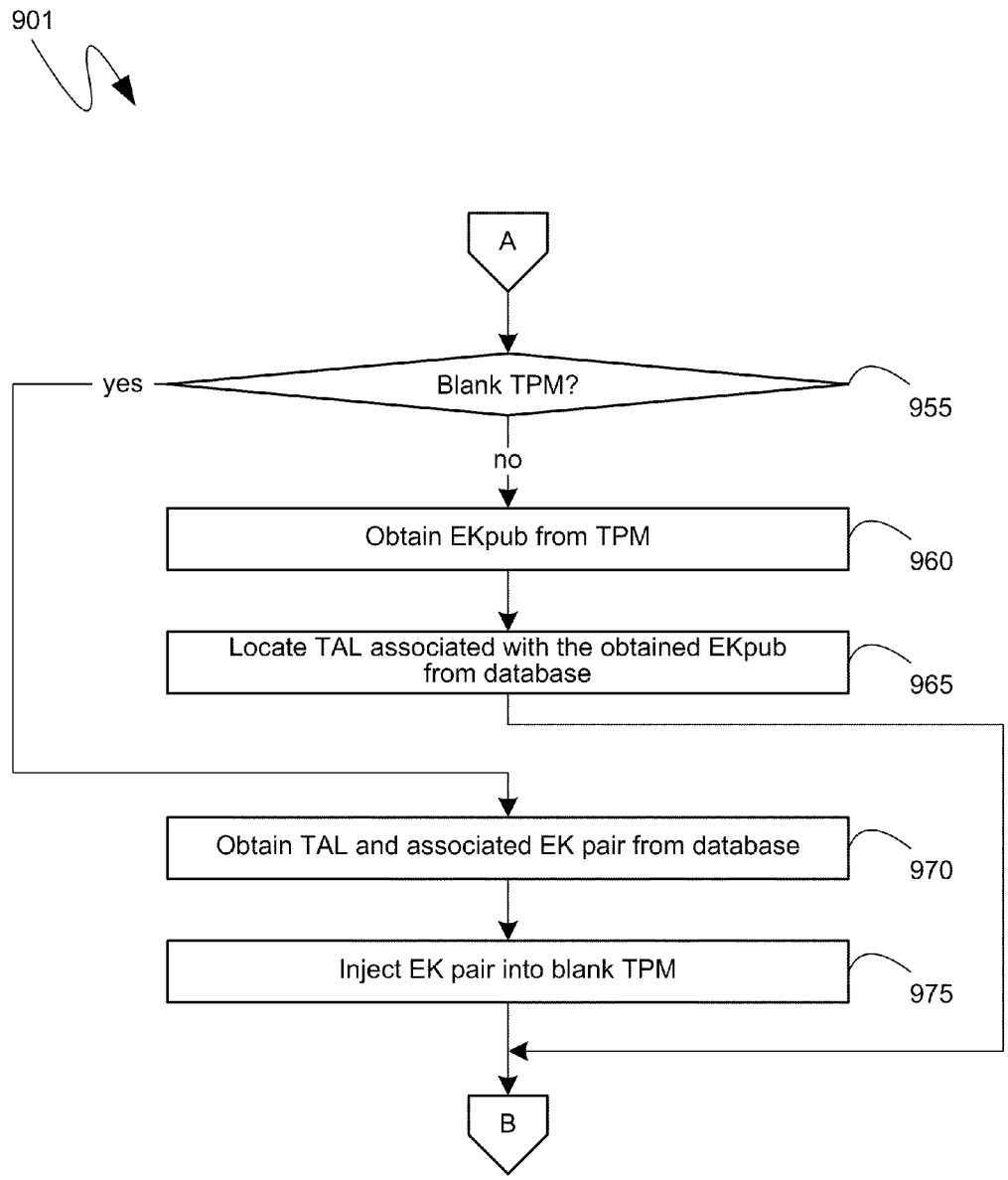

Turning to FIG. 9b, after determining, at step 915 of the flow diagram 900, that the computing device being manufactured is not a custom order, the computing device manufacturer can, at step 955, determine whether the TPM selected at step 910 of the flow diagram 900 is a blank TPM. If the TPM selected at step 910 of the flow diagram 900 already comprises an EK pair, then the computing device manufacturer can, at step 960, obtain the EKpub from the TPM and can, at step 965, using such information, locate one or more TALs that are associated with the EKpub obtained at step 960. More specifically, at step 965, the computing device manufacturer can search the database into which it stored the pre-generated TALs at step 880 of FIG. 8. Processing can then return to the steps of the flow diagram 900. However, if the TPM selected at step 910 of the flow diagram 900 is a blank TPM, as determined at step 955, processing can proceed with step 970, at which point the computing device manufacturer can obtain one or more TALs and the associated EK pair from the database, and can inject, at step 975, that EK pair into the blank TPM. Again, as before, the database referenced at step 970 can be the same database into which the computing device manufacturer can store the pre-generated TALs at step 880 of FIG. 8. Processing can then, again, return to the steps of the flow diagram 900.

Returning back to FIG. 9a, once the correct TAL has been obtained at step 965 of flow diagram 901, or once a TAL has been obtained at step 970 and the blank TPM has had an EK pair injected into it at step 975, the computing device manufacturer can install the TPM selected at step 910 into the computing device being manufactured at step 980. At step 985 the software applications associated with the TAL can be copied to a storage medium of the computing device, and at step 990 the TAL can be copied to an appropriate storage location on the computing device, such as in the ROM of the computing device, or into the BIOS of the computing device. The relevant manufacturing steps can then end at step 995.

If, however, at step 915, the computing device manufacturer determined that the computing device being manufactured was, in fact, a custom order, then, at step 920, the computing device manufacturer can obtain identifying information of the custom selected software applications that are to be installed on the customized computing device. At step 925, the computing device manufacturer can obtain the private keys of the software manufacturers of the custom selected software applications that are to be installed on the computing device. If the TPM selected at step 910 is found, at step 930, to be an already provisioned TPM, the computing device manufacturer can obtain the EKpub of the TPM at step 935, and can then proceed at step 950 to generate one or more TALs for the custom selected software applications. If, however, the TPM selected at step 910 is found, at step 930, to be a blank TPM, then, at step 940, the computing device manufacturer can generate an EK pair for the TPM and can, at step 945, inject that EK pair into the TPM. The computing device manufacturer can then proceed, at step 950, to generate the TAL, such as in the manner described in detail above.

Once the computing device manufacturer has generated the TAL, at step 950, for the custom selected software applications to be installed on the computing device, it can proceed to install, at step 980, the TPM selected at step 910, and can copy the custom selected software applications to the computing device at step 985, and the TAL to the ROM or BIOS at step 990, as described above. The relevant manufacturing steps can then end at step 995. As before, the ordering of the steps in the flow diagram 900 are meant to be exemplary only and are not meant to indicate required pre-conditions in every case. For example, the steps of 980, 985 and 990 can have been performed in any respective order.

Figure 10:
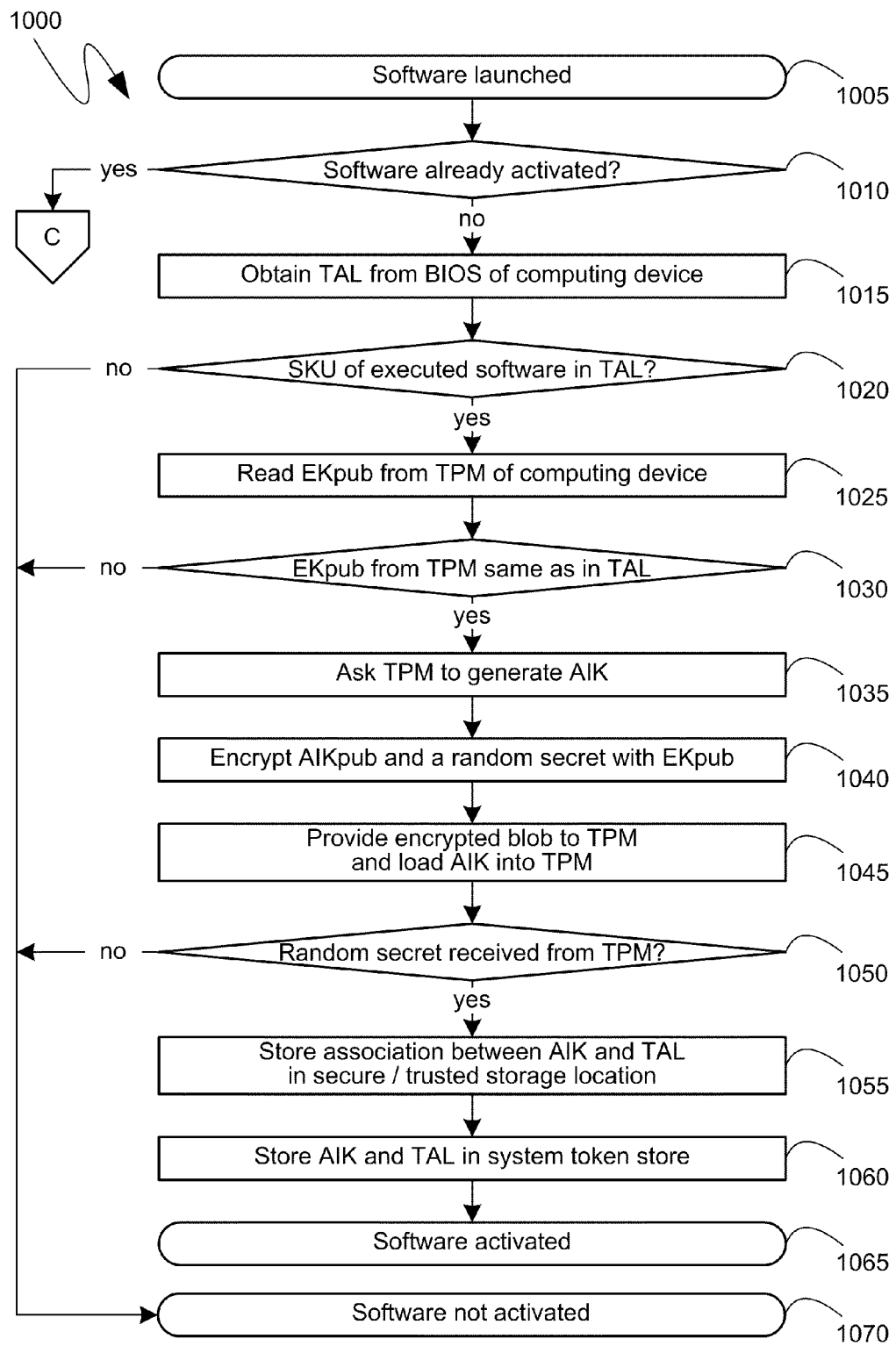
FIG. 10 is a flow diagram of an exemplary activation of software applications using a Trusted Activation License.

Turning to FIG. 10, the flow diagram 1000 shown therein illustrates an exemplary series of steps that can be performed by an activation service, such as the activation service 510 of FIG. 5. Initially, as shown in the flow diagram 1000, one of the bundled software applications can be launched at step 1005. Subsequently, at step 1010, a determination can be made as to whether the executed software application has already been activated. If the software application has not already been activated, as determined at step 1010, processing can proceed to step 1015, and the activation service can obtain the TAL, such as from the BIOS, or anywhere else in the ROM, or other storage location on the computing device. At step 1020, the activation service can examine the TAL obtained at step 1015 to determine whether the executed software application is identified in the TAL. For example, as described above, the determination of step 1020 can be made by comparing the SKU of the executed software to the SKUs in the TAL obtained at step 1015. If, at step 1020, it is determined that the executed software is not identified in the TAL, the activation service can not activate the software and can end appropriately at step 1070.

If, however, at step 1020, it is determined that the executed software application is identified in the TAL, activation can proceed by obtaining, at step 1025, the EKpub from the TPM of the computing device on which the software application was executed. At step 1030, the EKpub obtained at step 1025 can be compared to that in the TAL that was obtained at step 1015. If the two do not match, then the activation service can not activate the software and can end appropriately at step 1070. However, if, at step 1030, it is determined that the EKpub obtained from the TPM is the same as that in the TAL, processing can proceed to steps 1035 through 1050 to verify the authenticity of the EKpub provided by the TPM at step 1025. In particular, at step 1035, in a manner known to those skilled in the art, the activation service can ask the TPM to generate an AIK. As indicated previously, such a request can require the ownerAuth of the TPM, which, for purposes of the present description, can be assumed to be provided to the computer executable instructions performing the steps of flow diagram 1000. Subsequently, at step 1040, the activation service can generate a random secret and combine it with the public version of the AIK. The resulting combination can, also at step 1040, be encrypted with the EKpub obtained at step 1025. At step 1045, the encrypted data can be provided to the TPM and the AIK generated at step 1035 can be loaded into the TPM.

If the TPM really does possess the EK pair corresponding to the EKpub it provided at step 1025, it can decrypt the encrypted data provided to it at step 1045 using EKpriv and can, thereby, obtain the combination of the public version of the AIK and the random secret. Since the TPM is already aware of the public version of the AIK, since the AIK was loaded into the TPM at step 1045, the TPM can differentiate between the public version of the AIK and the secret and can, as a result, identify the random secret and return the random secret to the activation service. Thus, at step 1050, a determination can be made as to whether the random secret was properly returned from the TPM. If the random secret was not properly returned at step 1050, the TPM may not really possess the EK pair and its response at step 1025 was likely fraudulent. Consequently, the activation service can not activate the software and can end appropriately at step 1070. If, however, at step 1050, the TPM properly returns the random secret, then the TPM can have proven the authenticity of its response at step 1025.

At step 1055, the activation service can store an association between the AIK generated at step 1035 and the TAL obtained at step 1015 into a secure, or otherwise trusted, storage area. For example, as indicated previously, such association can be stored in a physical location of the hard disk drive that is inaccessible to most, if not all, processes other than the activation and validation processes. In addition, as an optional step, at step 1060, the AIK and the TAL can be stored in a system token store, or other like storage location, for easier and more efficient subsequent access, such as by a validation service. The software can then be activated at step 1065, and the relevant activation processing can end.

Figure 11:
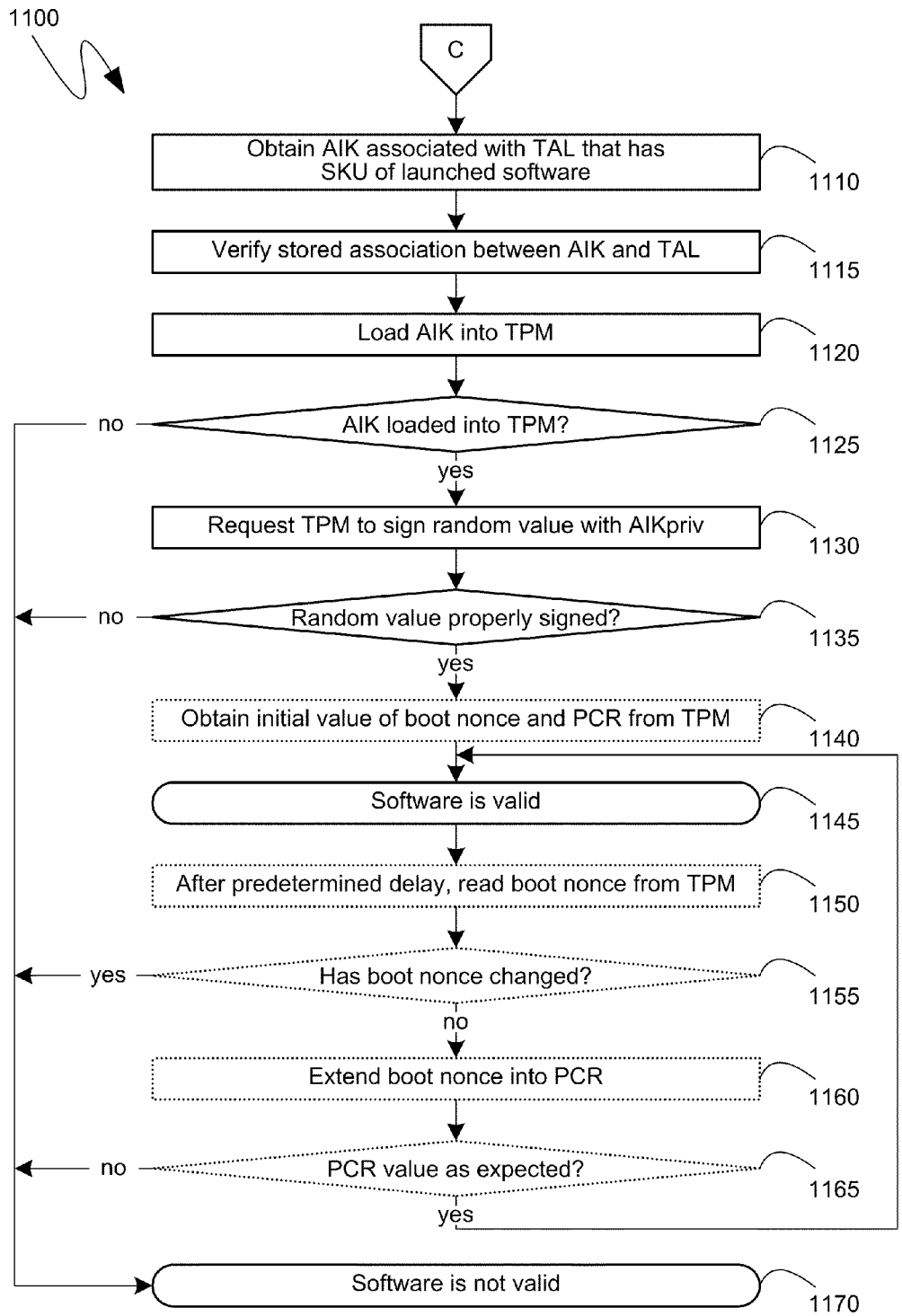
FIG. 11 is a flow diagram of an exemplary validation of software applications using a Trusted Activation License.

Turning to the flow diagram 1100 of FIG. 11, an exemplary series of steps that can be performed by a validation process are shown therein. If, at step 1010 of the flow diagram 1000 of FIG. 10, it was determined that the software application that was executed had already been activated, then processing can proceed with step 1110 in which the validation process can identify a TAL that has, for example, the SKU of the executed software application, and can then obtain the AIK that is associated with that identified TAL. At step 1115, the validation process can verify the stored association between the AIK and the TAL. For example, in one embodiment, the association between the AIK and the TAL can be stored in encrypted format such that its proper decryption can be the verification of step 1115.

Subsequently, at step 1120, the AIK can be loaded into the TPM. If the AIK is not properly loaded into the TPM, such as can be determined at step 1125, then the validation service can determine that the software is not valid and can end appropriately at step 1170. If, however, the AIK is loaded into the TPM at step 1120, and no error is found at step 1125, processing can proceed with step 1130, at which point the validation service can attempt to verify that the AIK was, in fact, actually loaded into the TPM. Specifically, in a manner well known to those skilled in the art, the validation service can, at step 1130, request that the TPM sign a random value, or other data generated or acquired by the validation service using the private version of the AIK that was supposedly loaded into the TPM at step 1120. The TPM can return the signed random value, whose signature the validation service can verify at step 1135 by using the public version of the AIK. If, at step 1135, it is determined that the random value was properly signed, the validation service can determine that the software is valid at step 1145. If, however, at step 1135, it is determined that the random value was not properly signed, the validation service can determine that the software is not valid and can end appropriately at step 1170.

As indicated previously, to guard against circumvention of the above described protections by utilizing a single computing device to act as a validation resource for multiple, unlicensed copies of software applications on multiple computing devices, an optional series of steps can be performed during validation to enable the validation service to detect if other validation services are simultaneously using the TPM on the computing device on which the validation service is executing. Such optional steps are indicated by dashed lines in the flow diagram 1100 of FIG. 11.

Specifically, after completing steps 1110 through 1135 to validate the software application being executed, the validation service can obtain an initial value of the boot nonce from the TPM at step 1140, and can also obtain an initial value of one or more PCRs whose value is no longer expected to change, except for changes that may be caused by the validation service. As explained previously, and as will be known to those skilled in the art, the boot nonce can be obtained from the tick counter value. Subsequently, at step 1150, after a predetermined delay, the validation service can again obtain the value of the boot nonce at that subsequent time. At step 1155, the current boot nonce can be compared against the initial boot nonce and if they are different, then the TPM was likely restarted while the software application that was executed continued to execute. Such a condition is very likely the result of interference in the above described mechanisms, and can, as illustrated in the flow diagram 1100 of FIG. 11, cause the validation service to determine that the software is no longer valid and can cause it to end appropriately at step 1170.

If, however, at step 1155, it is determined that the boot nonce has not changed, the activation service can request, at step 1160, that the TPM extend the one or more PCRs selected at step 1140 with the boot nonce, or any other random value. The activation service can, also, itself perform such an extension within its own memory space. Subsequently, then, at step 1165, the value of the one or more PCRs can be obtained from the TPM after the extension performed at step 1160, and can be compared against the expected values based on the extensions performed within the activation service's memory space. If, at step 1165, the two values are not the same, then the activation service can conclude that another activation service has utilized the TPM on the computing device in which the activation service is executing to perform a validation. In response, the validation service can determine that the software is no longer valid and can end appropriately at step 1170. If, however, at step 1165, the value of one or more of the PCRs obtained from the TPM is the same as that in the validation service's memory space, and the validation service can determine that the software applications being executed are still valid, then processing can return to repeat steps 1145 through 1165 while the software applications continue to be executed.

As can be seen, activation and validation mechanisms tied to a particular computing device via unique properties of that computing device's trusted platform module have been presented. In view of the many possible variations of the subject matter described herein, we claim as our invention all such embodiments as may come within the scope of the following claims and equivalents thereto.

We claim:
1. One or more computer-readable storage devices having computer-executable instructions for activating a copy of at least one software application, the computer-executable instructions performing steps comprising:
  obtaining identifying information of the copy of the at least one software application;
  finding a Trusted Activation License (TAL) comprising the identifying information;
  obtaining a public Endorsement Key (EKpub) from the TAL comprising the identifying information;
  requesting an EKpub of a Trusted Platform Module (TPM) of a computing device on which the computer-executable instructions are being executed;
  requesting that the TPM of the computing device generate an Attestation Identity Key (AIK) if the EKpub obtained from the TAL is equivalent to the EKpub of the TPM of the computing device;
  generating an indication that the copy of the at least one software application is invalid if either the finding the TAL comprising the identifying information was unsuccessful or if the obtained EKpub from the TAL is not equivalent to the EKpub of the TPM of the computing device;
  generating an association between the TAL and the AIK in a secure storage area if the finding the TAL comprising the identifying information was successful and the obtained EKpub from the TAL is equivalent to the EKpub of the TPM of the computing device; and
  activating the copy of the at least one software application if the finding the TAL comprising the identifying infor- mation was successful and the obtained EKpub from the TAL is equivalent to the EKpub of the TPM of the computing device.

2. The computer-readable device of claim 1, comprising further computer-executable instructions for performing steps comprising: obtaining a public key associated with a software manufacturer of the at least one software application; and verifying the TAL using the obtained public key; wherein the computer-executable instructions for activating the copy of the at least one software application comprise computer-executable instructions for activating the copy of the at least one software application if the finding the TAL comprising the identifying information was successful, the obtained EKpub from the TAL is equivalent to the EKpub of the TPM of the computing device, and the TAL is verified using the obtained public key.

3. The computer-readable storage device of claim 1, wherein the association between the TAL and the AIK comprises a hash of the TAL and a hash of the AIK stored in the secure storage area.

4. The computer-readable storage device of claim 1, comprising further computer-executable instructions for performing steps comprising: encrypting, with the EKpub obtained from the TAL, a combination of a secret and a public version of the AIK; loading the AIK into the TPM of the computing device; requesting that the TPM of the computing device decrypt the encrypted combination; receiving a returned secret from the TPM of the computing device in response to the requesting; comparing the returned secret received from the TPM to the secret and generating the indication that the copy of the at least one software application is invalid if the returned secret received from the TPM is not equivalent to the secret; wherein the generating the association between the TAL and the AIK in the secure storage area and the activating the copy of the at least one software application are only performed if the finding the TAL comprising the identifying information was successful, the obtained EKpub from the TAL is equivalent to the EKpub of the TPM of the computing device, and the returned secret received from the TPM is equivalent to the secret.

5. The computer-readable storage device of claim 1 comprising further computer-executable instructions for validating the copy of the at least one software application, the computer-executable instructions performing steps comprising:
  finding the TAL comprising the identifying information;
  verifying the association between the TAL and the AIK;
  loading the AIK into the TPM of the computing device;
  generating the indication that the copy of the at least one software application is invalid if either the finding the TAL comprising the identifying information was unsuccessful or if the AIK is not loaded by the TPM of the computing device; and
  validating the copy of the at least one software application if the TAL comprising the identifying information is found and the AIK is loaded by the TPM of the computing device.

6. The computer-readable storage device of claim 5, wherein the computer-executable instructions for validating perform further steps comprising: requesting that the TPM of the computing device sign data using the AIK; receiving the signed data from the TPM; verifying the signed data using the AIK; and generating the indication that the copy of the at least one software application is invalid if the signed data cannot be verified using the AIK; wherein the validating the copy of the at least one software application is performed if the TAL comprising the identifying information is found, the AIK is loaded by the TPM of the computing device, and the signed data is verified using the AIK.

7. The computer-readable storage device of claim 5, wherein the verifying the association between the TAL and the AIK comprises verifying a hash of the TAL and a hash of the AIK, both stored in the secure storage area.

8. The computer-readable storage device of claim 5, wherein the computer-executable instructions for validating perform further steps comprising: periodically obtaining a tick counter value from the TPM of the computing device; comparing a boot nonce of the obtained tick counter value to a prior boot nonce; and generating the indication that the copy of the at least one software application is invalid if the boot nonce of the obtained tick counter value differs from the prior boot nonce; wherein the validating the copy of the at least one software application is performed if the TAL comprising the identifying information is found, the AIK is loaded by the TPM of the computing device, and the boot nonce of the obtained tick counter value is equivalent to the prior boot nonce.

9. The computer-readable storage device of claim 5, wherein the computer-executable instructions for validating perform further steps comprising: periodically requesting that the TPM of the computing device extend at least one Platform Configuration Register (PCR) of the TPM with a value; performing an equivalent extension with the value to obtain an expected new PCR value; receiving a value of the at least one PCR from the TPM after the extension; and generating the indication that the copy of the at least one software application is invalid if the expected new PCR value differs from the value received from the TPM;
  wherein the validating the copy of the at least one software application is performed if the TAL comprising the identifying information is found, the AIK is loaded by the TPM of the computing device, and the expected new PCR value is equivalent to the value received from the TPM.

10. The computer-readable storage device of claim 5, wherein the computer-executable instructions for validating perform further steps comprising: requesting that the TPM sign its responses with the AIK.

11. The computer-readable storage device of claim 1, wherein the computer-executable instructions for obtaining the EKpub from the TAL comprise computer-executable instructions for obtaining a hash of the EKpub from the TAL; and wherein further the computer-executable instructions for requesting the EKpub of the TPM comprise computer-executable instructions for requesting a hash of the EKpub of the TPM.

12. A method of activating a copy of at least one software application, the method comprising the steps of:
  obtaining identifying information of the copy of the at least one software application;
  finding a Trusted Activation License (TAL) comprising the identifying information;
  obtaining a public Endorsement Key (EKpub) from the TAL comprising the identifying information;
  requesting an EKpub of a Trusted Platform Module (TPM) of a computing device on which the method is being performed;
  requesting that the TPM of the computing device generate an Attestation Identity Key (AIK) if the obtained EKpub from the TAL is equivalent to the EKpub of the TPM of the computing device;
  generating an indication that the copy of the at least one software application is invalid if either the finding the TAL comprising the identifying information was unsuccessful or if the obtained EKpub from the TAL is not equivalent to the EKpub of the TPM of the computing device;

generating an association between the TAL and the AIK in a secure storage area if the finding the TAL comprising the identifying information was successful and the obtained EKpub from the TAL is equivalent to the EKpub of the TPM of the computing device; and activating the copy of the at least one software application if the finding the TAL comprising the identifying information was successful and the obtained EKpub from the found TAL is equivalent to the EKpub of the TPM of the computing device.

13. The method of claim 12, further comprising the steps of: obtaining a public key associated with a software manufacturer of the at least one software application; and verifying the TAL using the obtained public key; wherein the activating the copy of the at least one software application comprises activating the copy of the at least one software application if the finding the TAL comprising the identifying information was successful, the obtained EKpub from the TAL is equivalent to the EKpub of the TPM of the computing device, and the TAL is verified using the obtained public key.

14. The method of claim 12, further comprising the steps of:

finding the TAL comprising the identifying information;
verifying the association between the TAL and the AIK;
loading the AIK into the TPM of the computing device;
generating the indication that the copy of the at least one software application is invalid if either the finding the TAL comprising the identifying information was unsuccessful or if the AIK is not loaded by the TPM of the computing device; and
validating the copy of the at least one software application if the TAL comprising the identifying information is found and the AIK is loaded by the TPM of the computing device.

15. A computing device comprising:

at least one processing unit;
a Trusted Platform Module (TPM) comprising a public Endorsement Key (EKpub);
a first storage device comprising a Trusted Activation License (TAL), the TAL comprising the EKpub of the TPM and a unique identifier of each of one or more software applications; and
a second storage device comprising the one or more software applications and computer-executable instructions for activating a copy of at least one of the one or more software applications, the computer-executable instructions, when executed by the at least one processing unit, performing steps comprising:
  obtaining identifying information of the copy of the at least one software application;
  finding the TAL;
  obtaining the EKpub from the TAL;
  requesting an EKpub of the TPM;
  requesting that the TPM generate an Attestation Identity Key (AIK) if the EKpub from the TAL is equivalent to the EKpub of the TPM;
  generating an indication that the copy of the at least one software application is invalid if either the finding the TAL was unsuccessful or if the obtained EKpub from the TAL is not equivalent to the EKpub of the TPM;
  generating an association between the TAL and the AIK in a secure storage area if the finding the TAL was successful and the obtained EKpub from the TAL is equivalent to the EKpub of the TPM of the computing device; and
  activating the copy of the at least one software application if the finding the TAL was successful and the obtained EKpub from the TAL is equivalent to the EKpub of the TPM of the computing device.

16. The computing device of claim 15, wherein the second storage device comprises further computer-executable instructions for: obtaining a public key associated with a software manufacturer of the at least one software application; and verifying the TAL using the obtained public key; wherein the activating the copy of the at least one software application comprises activating the copy of the at least one software application if the finding the TAL was successful, the obtained EKpub from the TAL is equivalent to the EKpub of the TPM, and the TAL is verified using the obtained public key.

17. The computing device of claim 15, wherein the second storage device comprises further computer-executable instructions for:

finding the TAL;
verifying the association between the TAL and the AIK;
loading the AIK into the TPM;
generating the indication that the copy of the at least one software application is invalid if either the finding the TAL was unsuccessful or if the AIK is not loaded by the TPM of the computing device; and
validating the copy of the at least one software application if the TAL is found and the AIK is loaded by the TPM.

* * * * *